(12) United States Patent
Feibelman et al.

(10) Patent No.: US 6,499,017 B1
(45) Date of Patent: Dec. 24, 2002

(54) METHOD FOR PROVISIONING COMMUNICATIONS DEVICES AND SYSTEM FOR PROVISIONING SAME

(75) Inventors: Eric Young Feibelman, Indian Harbour Beach, FL (US); Adriana Weiss, Indialantic, FL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/240,437

(22) Filed: Jan. 29, 1999

(51) Int. Cl.[7] .............................................. G06F 17/60
(52) U.S. Cl. ........................... 705/8; 705/1; 379/15.03; 379/10.03; 379/201.03
(58) Field of Search .................. 379/201.12, 201.01, 379/201.02, 201.03, 93.12, 15.03, 10.03; 705/1, 7, 8, 26

(56) References Cited

U.S. PATENT DOCUMENTS

| | | | | |
|---|---|---|---|---|
| 5,323,452 A | * | 6/1994 | Dickman et al. | 379/201 |
| 5,353,339 A | * | 10/1994 | Scobee | 379/207 |
| 5,528,677 A | * | 6/1996 | Butler et al. | 379/201 |
| 5,640,505 A | * | 6/1997 | Hearn et al. | 379/201 |
| 5,680,390 A | * | 10/1997 | Robrock, II | 370/229 |
| 5,751,802 A | * | 5/1998 | Carr et al. | 379/201 |
| 5,848,141 A | * | 12/1998 | Beck et al. | 379/201 |
| 5,881,131 A | * | 3/1999 | Farris et al. | 379/201 |
| 5,883,946 A | * | 3/1999 | Beck et al. | 379/201 |
| 5,946,383 A | * | 8/1999 | Havens et al. | 379/207 |
| 6,069,944 A | * | 5/2000 | Cretch | 379/210 |
| 6,078,741 A | * | 6/2000 | Ma et al. | 395/500.45 |
| 6,080,202 A | * | 6/2000 | Strickland et al. | 703/27 |
| 6,104,796 A | * | 8/2000 | Kasrai | 379/201 |
| 6,104,798 A | * | 8/2000 | Lickiss et al. | 379/201 |
| 6,167,126 A | * | 12/2000 | Janning | 379/201 |
| 6,243,451 B1 | * | 6/2001 | Shah et al. | 379/201 |
| 6,275,570 B1 | * | 8/2001 | Homan et al. | 379/201.12 |
| 6,304,647 B1 | * | 10/2001 | Frost | 379/201.12 |
| 6,324,275 B1 | * | 11/2001 | Yagel et al. | 379/201.03 |
| 6,330,319 B1 | * | 12/2001 | Moghuie | 379/201.03 |

FOREIGN PATENT DOCUMENTS

| | | | |
|---|---|---|---|
| WO | WO 95/23483 | * | 8/1995 |
| WO | WO 96/07281 | * | 3/1996 |
| WO | WO 96/25012 | * | 8/1996 |

OTHER PUBLICATIONS

Anonymous, "Customer Network Security—Customer Concerns Acknowledged", EDGE, On & About AT&T, vol. 3, No. 43, Aug. 22, 1998.*

Bucholtz, Chris, "OSI Expert System Focuses on Service", Telephony, vol. 230, No. 26, p. 16, Jun. 24, 1996.*

* cited by examiner

Primary Examiner—James P. Trammell
Assistant Examiner—Joan W. Hayes
(74) Attorney, Agent, or Firm—Harry M Fleck

(57) ABSTRACT

A method of provisioning communication devices is provided which preferably includes transferring a customer order to an order database. The transferred customer order preferably includes an order sequence. A due order is then retrieved from the order database responsive to the order sequence. The due order is representative of a next customer order due. The method also includes retrieving at least one provisioning rule from a rule database having a plurality of rules stored therein and responsive to the retrieve due order, executing a provisioning script representative of instructions for provisioning communication devices to provide a customer selected service responsive to the at least one retrieved provisioning rule, and provisioning communication devices responsive to the generated provisioning script. The system preferably includes a customer order interface positioned to interfacingly receive a customer service order, a rule-based script provision selector positioned in communication with the customer order interface to select a rule-based provisioning script to provision communication devices, and a communication devices interface positioned in communications with the rule-based script provision selector for interfacingly providing the rule-based script to communication devices to thereby perform a provisioning request thereon.

24 Claims, 4 Drawing Sheets

METHOD FOR PROVISIONING COMMUNICATIONS DEVICES AND SYSTEM FOR PROVISIONING SAME

FIELD OF THE INVENTION

This invention is related to the communications industry and, more particularly, to a method and system for interconnecting communication devices responsive to customer orders.

BACKGROUND OF THE INVENTION

The explosion of today's telecommunications market of various communications providers, different equipment manufacturers, types of equipment, multitudes of services and locations has become one of the biggest challenges for telecommunications companies. The provisioning of equipment, services, maintaining constant changes and updates has become a very costly and labor intensive process.

Also, many telecommunications companies are now getting into several different service offerings beyond Plain Old Telephone Service (POTS) such as Internet Service Provider, Voice Messaging, Wireless Services, Cable Television, ISDN, XDSL, as well as many others. When a customer calls in asking for one or more services, many times the provisioning order requires the activation of many different network components or communication devices. Provisioning, for example, conventionally requires numerous personnel and countless hours to determine which pieces of equipment or devices for what services require what changes, activations, and/or turn-ups. Multiple devices or equipment often need to be configured for a single order. Customer data, service type, and other information all have to be entered manually on multiple terminals. This process can be a very time consuming and costly necessity.

Some provisioning systems have been developed in attempts to address some of these concerns. Examples of such systems can be seen in U.S. Pat. No. 5,680,390 by Robrock, II titled "Broadband Telecommunications Network And Method Of Having Operations Systems Support" and U.S. Pat. No. 5,848,141 by Beck et al. titled "Method And Apparatus For Provisioning Call Processing Records Using Logic And Data Templates." These prior systems, however, are quite complex, costly, require extensive hardware and/or software, and only focus on a specific portion of the overall system or a specific customized application. In other words, such systems are not flexible enough and portable enough to be used on a wide variety of interconnecting or provisioning applications and fail to take into account the constraints on the entire system.

SUMMARY OF THE INVENTION

In view of the foregoing, the present invention advantageously provides a method and system for more effectively and flexibly interconnecting communications equipment or devices. The present invention also advantageously provides a method and system for automatically provisioning communications equipment or devices responsive to an entry from a customer system or order entry interface where a service request is electronically entered. The present invention additionally advantageously provides a simplified and portable system and method which can be used on a wide variety of communications equipment or devices. The present invention further advantageously provides customer interface personnel, users or application specialists, and communications companies more degrees of freedom to accomplish various interconnecting functions such as provisioning.

More particularly, a method of provisioning communication devices according to the present invention at least preferably includes the steps of retrieving at least one predetermined provisioning rule from a rule database responsive to a due customer order and executing a provisioning script representative of instructions for provisioning a plurality of communication devices, such as telecommunication devices, to provide a customer selected service responsive to the at least one retrieved provisioning rule. The step of executing a script preferably includes determining if the rule database includes a predetermined provisioning rule.

The method can also advantageously include generating a customer order including data representative of a transaction type and an order sequence for performing the transaction and retrieving a due customer order from an order database. The due customer order also includes the transaction type. The step of retrieving a due customer order preferably includes the step of polling the order database for a pending transaction type. The method can additionally include logging data in the order database representative of customer orders which have been provisioned so as to define a logged audit trail.

The present invention also provides a system for provisioning communication devices, and more particularly telecommunication devices. The system preferably includes customer order interfacing means for interfacingly receiving a customer service order, rule-based script provision selecting means positioned in communication with the customer order interfacing means for selecting a rule-based script to provision communication devices, and communication devices interfacing means positioned in communications with the rule-based script provision generating means for interfacingly providing the rule-based script to communication devices to thereby perform a provisioning request thereon.

The customer order interfacing means preferably includes an input scripted provisioning driver, and the communication devices interfacing means preferably includes an output scripted provisioning driver. The rule-based script provision selecting means preferably includes a provisioning engine having a customer order database for storing customer orders therein. The customer order includes a transaction type. The rule-based script provision selecting means also includes a rule database for storing a plurality of provisioning rules therein and a rule-based executor responsive to the customer order database and the rule database for executing a provisioning script based upon the transaction type of a customer order.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
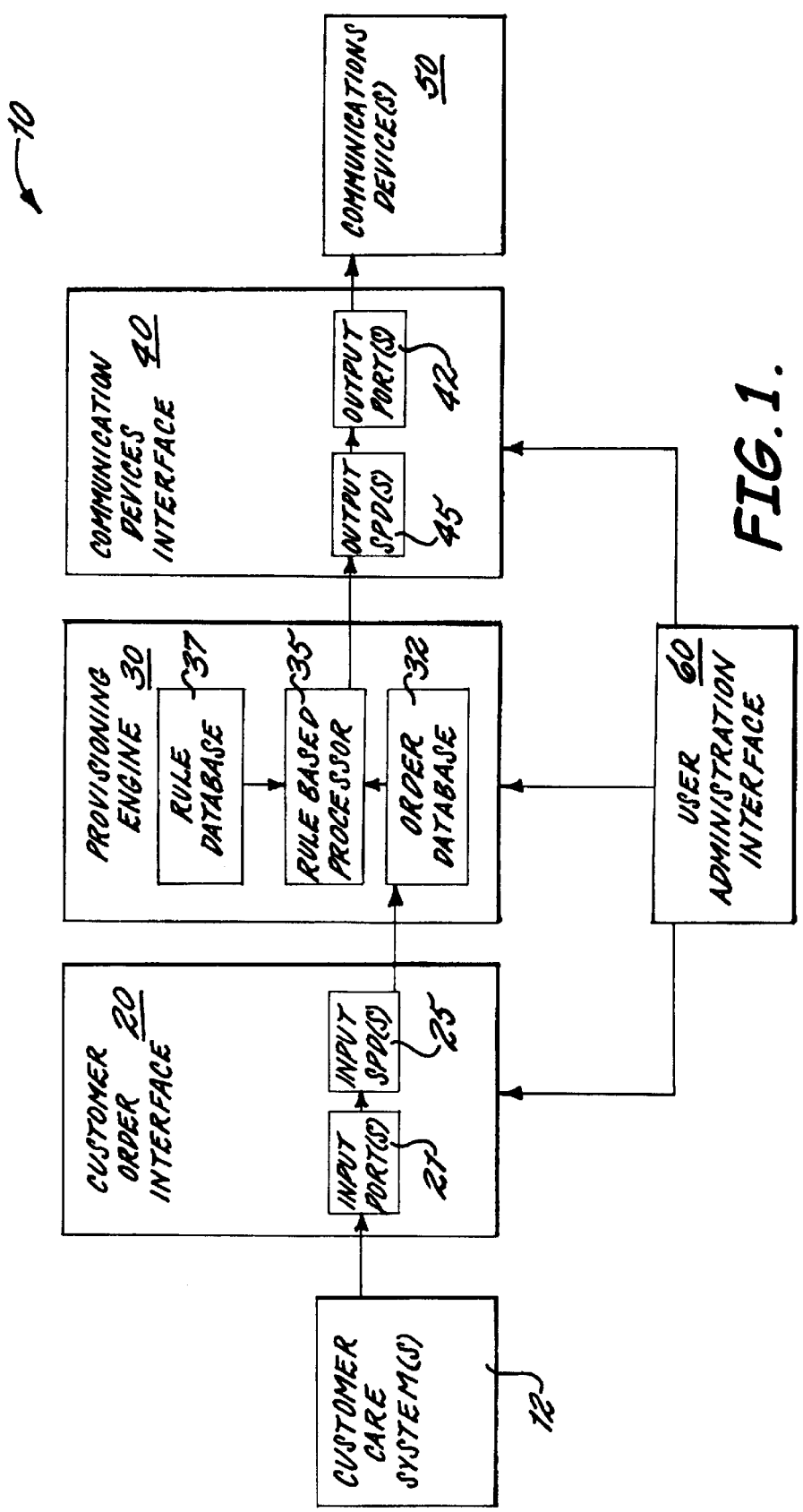
FIG. 1 is a schematic diagram of a system for provisioning communication devices according to the present invention.
Figure 2:
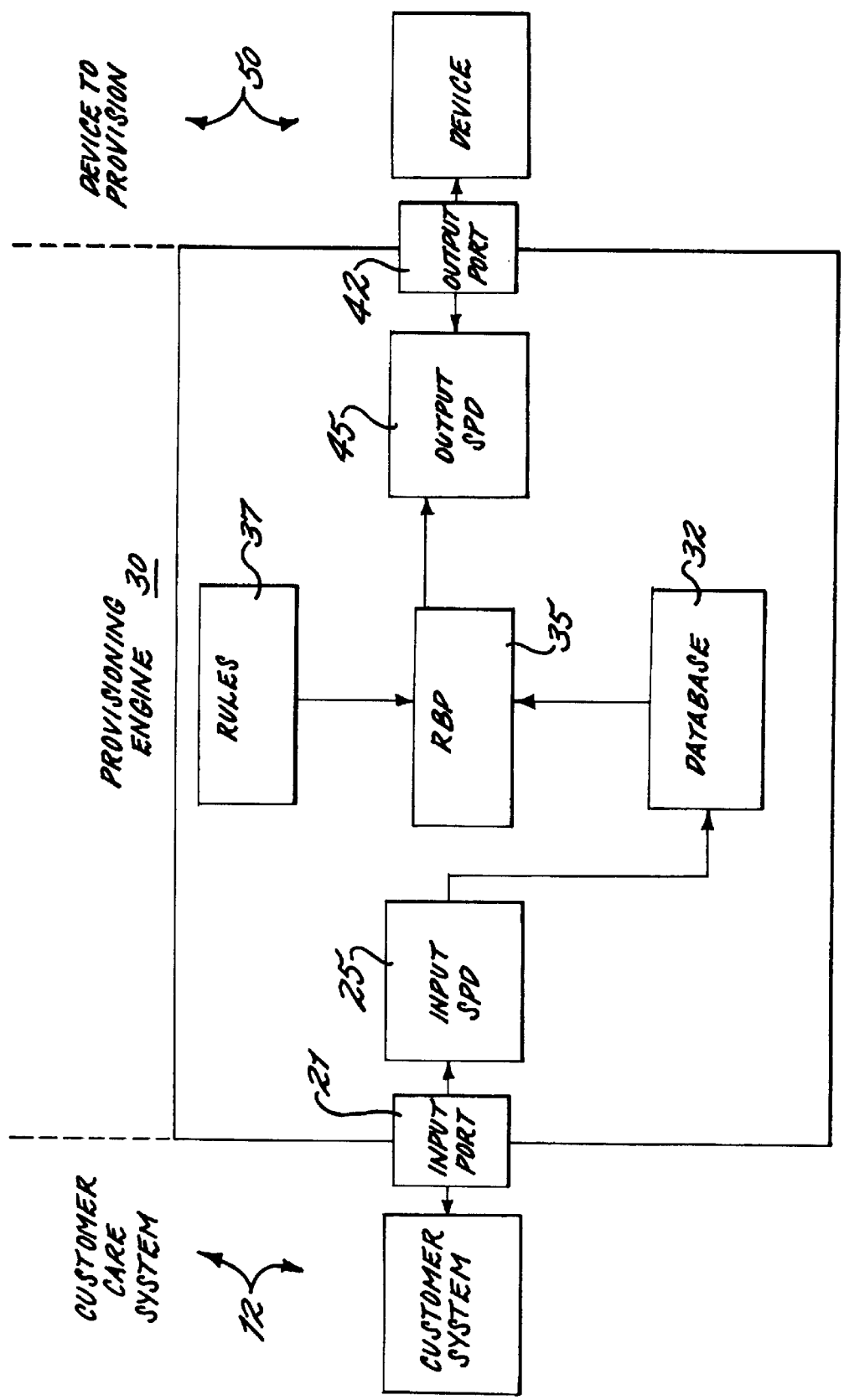
FIG. 2 is a schematic view of a system using a method of provisioning communication devices according to the present invention.

FIGS. 1–2 illustrate schematic diagram of a system 10 and method of provisioning communication devices 50 according to the present invention. In an overview, the system 10 preferably includes customer order interfacing means 20 for interfacingly receiving a customer service order, rule-based script provision selecting means 30 positioned in communication with the customer order interfacing means 20 for selecting a rule-based script to provision a plurality of communication devices 50, and communication devices interfacing means 40 positioned in communications with the rule-based script provision selecting means 30 for interfacingly providing the rule-based script to communication devices 50 to thereby perform a provisioning request thereon.

The customer order interfacing means, e.g., preferably provided by a customer order interface 20, preferably includes one or more input port(s) 21 and an input scripted provisioning driver ("SPD") 25 positioned in communication with or connected to each of the input ports 21. The input SPD 25 advantageously can perform various functions as understood by those skilled in the art. For example, the input SPD 25 can translate, add, subtract, validate order data, request further data or information about an order, transfer or go to other portions of the system to obtain, check, or verify information.

Figure 3:
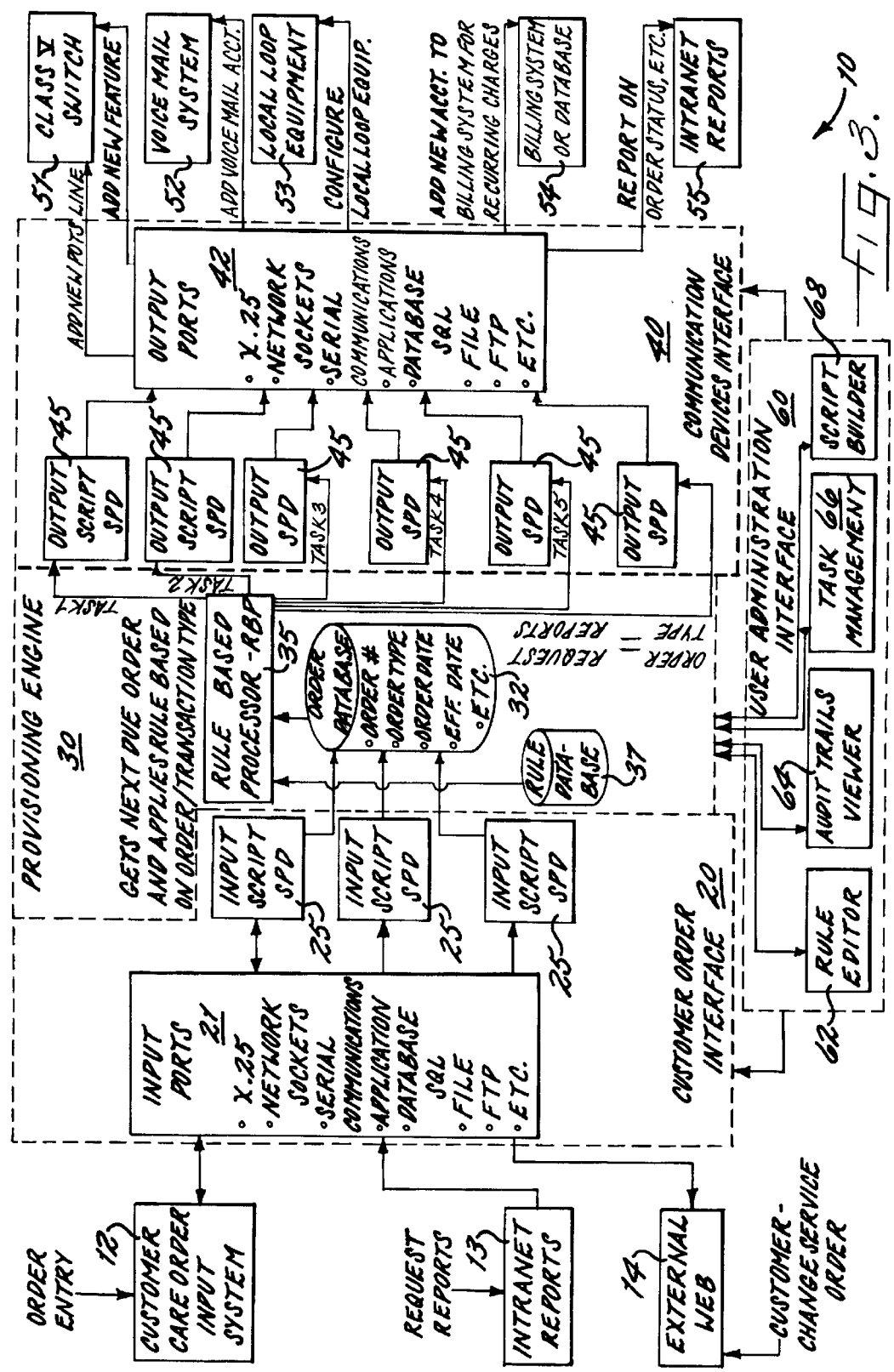
FIG. 3 is a schematic view of an embodiment of a system for provisioning communication devices according to the present invention.

Likewise, the communication devices interfacing means, e.g., preferably provided by a communication devices interface 40, preferably includes one or more output ports 42 positioned to communicate with a plurality of different communication devices 50, e.g., Class V switch 51 for adding new POTS line or new features, a voice mail system 52 for adding a voice mail account, local loop equipment 53 for configuring a local loop, a billing system 54 or database for adding new accounts to billing system to initiate recurring charges, intranet reports 55 for reports on order status, as well as other devices such as external database, external website (see e.g., FIG. 3). An output scripted provisioning driver ("SPD") 45 is positioned in communication with or connected to the output ports 42. The output SPD 45 can advantageously run or execute the one or more provisioning scripts which add, cancel, configure, or report the communication devices 50 capabilities to the customer.

The rule-based script provision selecting means, e.g., preferably provided by a rule-based script provisioning selector, preferably includes a provisioning engine 30 having a customer order database 32 for storing customer orders therein. The customer order preferably includes a transaction type and an order sequence. As used herein, the order sequence of a customer order can include an effective date for the order, immediate action or implementation of an order, a order handling scheme such as first-in-first-out, ignore or hold types of order, move or jump ahead of other orders, a priority scheme, or other ways to prioritize, handle, or perform order requests. The provisioning engine 30 also includes a rule database 37 for storing a plurality of provisioning rules therein and a rule-based processor 35 responsive to the customer order database 32 and the rule database 37 for selecting a provisioning script to be processed or executed based upon the transaction type of a customer order.

The methods used for operation of or with the system 10 are based on several main concepts. First, each service or order to be provisioned is preferably assigned a transaction type. A set of rules is then queried by transaction type. The rule retrieved will define a set of operations to be performed to do the provisioning for that transaction type. The rules preferably specify from which input port(s) 21 and which order or transaction type will the output scripts execute and in which order and to which devices 50. Communication devices 50 as used herein includes all types of communication devices, equipment, applications, external databases, external websites, inventory systems, billing systems, intranet reports, and other devices as understood by those skilled in the art (see, e.g., FIG. 3).

For example, the following illustrates a rule command or sequence: "Transaction type coming form input port 21 will on output port 42 run script script." The script is understood to be one or more of the provisioning scripts which provides set-up, connect, disconnect, activate, de-activate, or other instructions for the various communication devices 50. As understood by those skilled in the art, scripts can be written using a selected scripting language. As also understood by those skilled in the art, various scripting languages can be used. The scripts are the pieces of the application that actually retrieve the information from the Customer Care Service and do the provisioning of the equipment. The ports 21, 42 identify interfaces to the customer care system 12 from which a provisioning engine 30 will be retrieving transactions and the equipment or devices 50 to be provisioned. As understood by those skilled in the art, the scripts include a plurality of different commands upon which each script is written or based, e.g., logic, parsing, conditionals, file, database, and simple network management protocol ("SNMP") commands, protocol oriented commands, translation and conversion commands, binary manipulation, auditing, encoding and decoding, searching, and others as well.

As illustrated in FIGS. 1–3, the Customer Care System 12 is used by the customer to record various service orders and will provide an interface to the software driven portion of the application, e.g., customer order interface 20. Although particularly advantageous for provisioning functions, the software driven portion of the application forms an interconnection gateway which also can advantageously be used for various other interconnecting functions such as billing, inventory, diagnostic, data mining, migration, reconciliation, and normalization, and others as understood by those skilled in the art. The software driven portion of the application, e.g., preferably at least the input SPD(s), provisioning engine, output SPD(s), is preferably written in object-oriented software as understood by those skilled in the art.

The customer order interface 20 advantageously can include one or more of a file, a set of Database Tables, a network socket, a serial port, X.25, applications, ftp, SNMP, and others, for example, which form one or more input port(s) 21. The communications devices 50 to be provisioned can be any devices, equipment, or systems that needs to be provisioned or interconnected according to customer service orders. This device will also provide an interface to the software driven application. The communication devices interface likewise can include one or more of a file, a set of Database Tables, a network socket, X.25 applications, ftp, a serial port, SNMP, or others, for example, which form one or more output port(s) 42.

As perhaps best shown in the schematic diagram of FIG. 2, the system 10 preferably includes an Input Scripted Provisioning Driver ("SPD") 25. The Input SPD 25 of the system 10 performs the retrieving of the order from the Customer Care System 12. The Input SPD 25 preferably continuously polls the Customer Care System 12 through the selected interface type and stores the orders retrieved in the order database 32. The databases of the provisioning engine are preferably sequel query language ("SQL") compliant or are some other type of relational database management system as understood by those skilled in the art. The Rule Base Processor ("RBP") 37 is positioned in communication with or connected to the order database 32 and continuously polls the order database 32 for due customer service orders. Each order preferably has a order number, an order or transaction type, an order sequence, e.g., an effective date, an order date, customized tables, and other tables or information as desired (see FIG. 3). Once the RBP 35 retrieves or receives an order, the RBP 35 queries a set of rules in the rule database 37 using the transaction type of the order. The retrieved rule will tell the RBP 35 which of one or more provisioning script(s) to run and on which port(s) to service the order. The RBP 35 gets the next due order and applies one or more rules based upon an order or transaction type associated with an order (see FIG. 3). The RBP 35 is also positioned in communication with and/or connected to an Output Script Provisioning Driver ("SPD") 45 and tells the Output SPD 45 to execute or run the provisioning script. This executing of the provisioning script also tells the Output SPD 45 which tasks to run or not to run, e.g., task 1, task 2, task 3, task 4, task 5, order, request, type, reports, and in which order. In other words, the RBP 35 controls or directs the output SPD(s) 45. Also, the provisioning engine 30 can also include other databases such an auditing database to assist with other desired function. These additional databases are also preferably positioned in communciation with the RBP 35. It will also be understood by those skilled in the art that a portion of he processor itself can contain the databases described herein which would also be understood to be in communication with or connected to the RBP 35.

As shown in FIGS. 1 and 3, the system 10 also preferably includes a user administration interface 60. This administration interface 60 advantageously allows the provisioning or other interconnection functional rules and scripts to be flexibly written, changed, modified, added, or otherwise customized for specific applications. The administration interface 60, for example, can include a rules editor 62 for editing the rules in the rule database 37, an audit trails viewer 64 for viewing the status of orders or the application process itself, a task management or manager 66 which assists in managing specific tasks of the provisioning engine 30, if needed, and a script builder 68 for building or developing scripts for provisioning or performing other functions on communication devices 50 or other types of devices. The concept of rule based processing for interconnection gateways has particular importance in provisioning, for example, because on the input end the customer order systems 12, intranet reports 13, external web 14, or other inputs can have various configurations or specifications and can be from various companies or manufacturers. Likewise, the communication devices 51, 52, 53, 54, 55 or other devices on the output end can also have various configurations or specifications and can be from various companies or manufacturers.

The system 10 user can then customize script (i.e., dumb script) of the input SPD 25 to accommodate the various input devices and the output SPD 45 to accommodate the various output devices. This provides a tremendous increase in flexibility or degrees of freedom when providing provisioning or other interconnection gateway function. The administration interface 60 likewise can then flexibly tailor the rule-based concepts as described for the interconnection gateway function, and more particularly for provisioning service or order requests for various devices or equipment in a seamless and more efficient process or pathway for customer order personnel. The system 10 and methods advantageously allow the ultimate customer placing the order to receive services more quickly or in a more timely and controlled manner, for less costs, e.g., fewer personnel and less hardware involved, and with an increased confidence that the order request will be performed in a quality manner.

Figure 4:
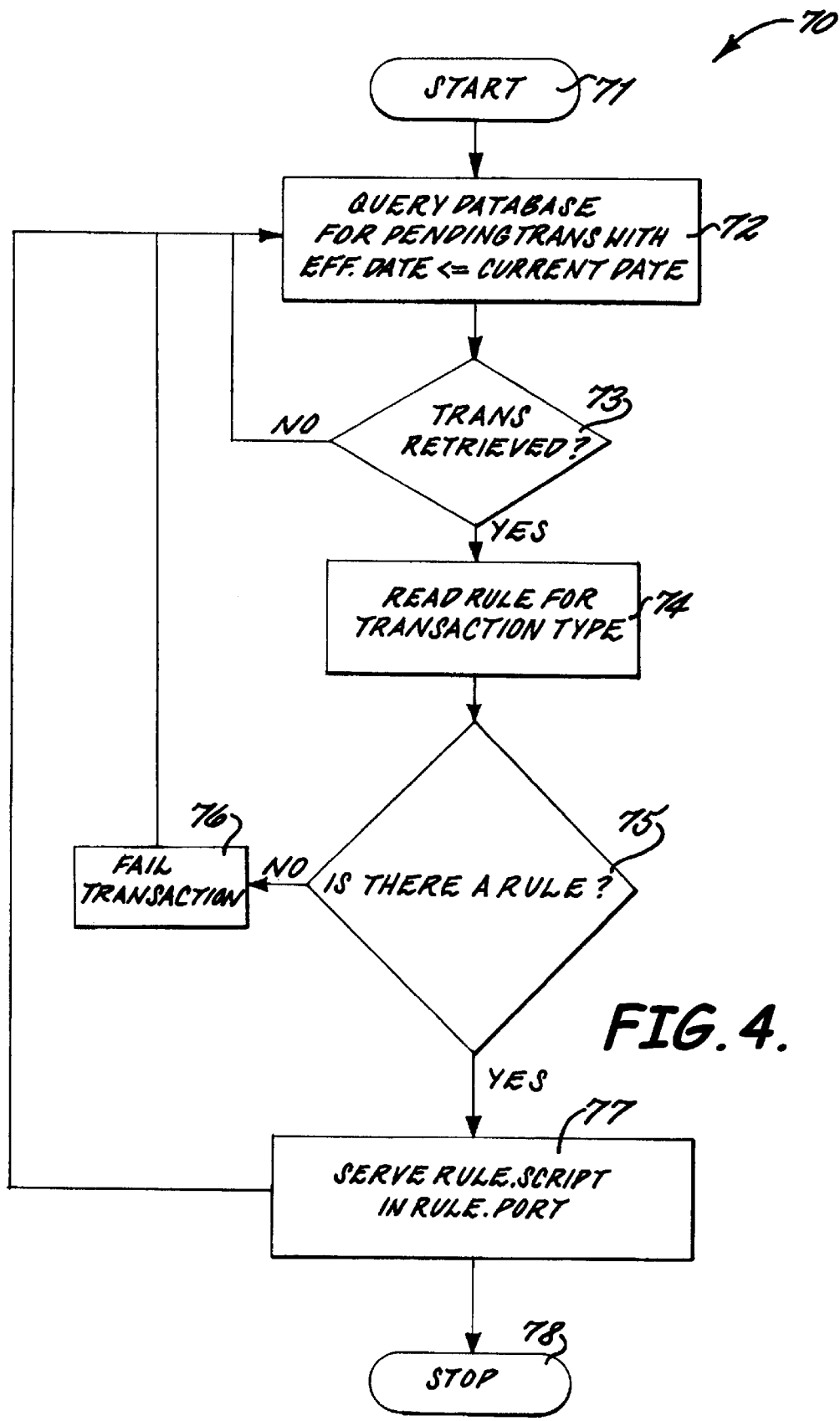
FIG. 4 is a flow chart of a method of rule-based provisioning according to the present invention.

The flow chart of FIG. 4 more specifically shows the process 70 executed by the RBP 35. As understood by those skilled in the art, the Output SPD 45 will then perform or execute the actual provisioning script for the devices 50 or equipment, through the selected interface. After starting 71, the order database 32 is queried 72 for pending orders or transactions based upon the order sequence, e.g., an effective date. The RBP is essentially looking to determine, e.g., continuously polling, if a transaction or order has been received 73. If no transaction is retrieved, the order database 32 continues to be queried or polled for the next order. If a transaction is retrieved, then a rule for the transaction or order type is read or selected 74. Next, a determination is made on whether a rule exists for the transaction or order type 75. If no rule exists, then the transaction fails 76, and the order database 32 will continue to be polled. If a rule exists, then the provisioning script based upon the rule is served or transferred 77 to the output SPD 45 for execution to thereby provision the one or more communication devices 50 necessary to complete the customer order or request.

As illustrated in FIGS. 1–4, and as described above, the methods of the present invention preferably include generating a customer order including data representative of a transaction type and an order sequence for performing the transaction, retrieving a customer order representative of at least one desired service, and transferring the customer order to an order database 32. The customer order, for example, can be generated by customer telephone ordering system or other customer care system, e.g., using personnel or recorded interface systems. The method also includes retrieving a due order from the order database 32 responsive to the order sequence. The due order is preferably representative of a next customer order due. The method additionally includes retrieving at least one provisioning rule from a rule database 37 responsive to the retrieve due order, executing a provisioning script representative of instructions for provisioning communication devices, e.g., telecommunication devices, to provide a customer selected service responsive to the at least one retrieved provisioning rule, and provisioning at least one of a plurality of communication devices 50 responsive to the provisioning script.

The step of generating a script preferably includes determining if the rule database 37 includes a provisioning rule for the transaction type of the due order, and the step of retrieving a due order includes the step of polling the order database 32 for a pending transaction type. Further, the method can include logging data in the order database 32 representative of customer orders which have been provisioned so as to define a logged audit trail.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of provisioning communication devices comprising the steps of:

retrieving a customer order representative of at least on desired service;

transferring the customer order to an order database, the transferred customer order including a transaction type and an order sequence;

retrieving a due order from the order database responsive to the order sequence, the due order being representative of a next customer order due, the step of retrieving a due order including the step of polling the order database for a pending transaction type;

retrieving at least one provisioning rule from a rule database responsive to the retrieve due order;

executing at least one provisioning script representative of instructions for provisioning communication devices to provide a customer selected service responsive to the at least one retrieved provisioning rule, the step of executing a provisioning script including determining if the rule database includes a provisioning rule for the transaction type of the due order;

provisioning a plurality of communication devices responsive to the at least one provisioning script; and generating a customer order including data representative of a transaction type and an order sequence for performing the transaction, the retrieved due order also including the transaction type.

2. A method as defined in claim 1, wherein the communication devices includes telecommunication devices, and wherein the customer order is generated from a customer telephone service ordering system.

3. A method as defined in claim 2, wherein the customer order is retrieved from an input communications port, and wherein the step of provisioning communication devices includes transferring the provisioning script to an output communications port.

4. A method as defined in claim 3, further comprising providing a provisioning engine positioned in communication with the input communications port and the output communications port which retrieves the due orders, retrieves the at least one provisioning rule, and executes the provisioning script.

5. A method as defined in claim 4, wherein the input communications port includes an input scripted provisioning driver, and wherein the output communications port includes an output scripted provisioning driver.

6. A method as defined in claim 5, further comprising logging data in the order database representative of customer orders which have been provisioned so as to define a logged audit trail.

7. A method of provisioning communication devices comprising the steps of:

transferring a customer order to an order database;

retrieving a due order from the order database, the due order being representative of a next customer order due, the step of retrieving a due order including the step of polling the order database for a pending transaction type;

retrieving at least one provisioning rule from a rule database having a plurality of rules stored therein and responsive to the retrieve due order;

executing a provisioning script representative of instructions for provisioning communication devices to provide a customer selected service responsive to the at least one retrieved provisioning rule, the step of executing a provisioning script including determining if the rule database includes a provisioning rule for the transaction type of the due order;

provisioning communication devices responsive to the generated provisioning script; and generating a customer order including data representative of a transaction type and an order sequence for performing the transaction, the retrieved due order also including the transaction type.

8. A method as defined in claim 7, wherein the communication devices includes telecommunication devices, and wherein the customer order is generated from a customer telephone service ordering system.

9. A method as defined in claim 7, further comprising logging data in the order database representative of customer orders which have been provisioned so as to define a logged audit trail.

10. A method as defined in claim 9, wherein the customer order is retrieved from an input communications port, and wherein the step of provisioning communication devices includes transferring the generated provisioning script to an output communications port.

11. A method as defined in claim 10, further comprising providing a provisioning engine positioned in communication with the input communications port and the output communications port which retrieves the due orders, retrieves the at least one provisioning rule, and generates the provisioning script.

12. A method as defined in claim 10, wherein the input communications port includes an input scripted provisioning driver, and wherein the output communications port includes an output scripted provisioning driver.

13. A method of provisioning communication devices comprising the steps of:

retrieving at least one provisioning rule from a rule database responsive to a due customer order, the step of retrieving a due customer order including the step of polling the order database for a pending transaction type;

executing a provisioning script representative of instructions for provisioning communication devices to provide a customer selected service responsive to the at least one retrieved provisioning rule; and generating a script for determining if the rule database includes a predetermined provisioning rule.

14. A method as defined in claim 13, further comprising generating a customer order including data representative of a transaction type and an order sequence for performing the transaction, retrieving a due customer order from an order database, and wherein the due order also includes the transaction type.

15. A method as defined in claim 14, further comprising logging data in the order database representative of customer orders which have been provisioned so as to define a logged audit trail.

16. A method as defined in claim 13, wherein the communication devices includes telecommunication devices, and wherein the customer order is generated from a customer telephone service ordering system.

17. A method as defined in claim 13, wherein the customer order is retrieved from an input communications port, wherein the step of provisioning communication devices includes transferring the generated provisioning script to an output communications port, and wherein the method further includes provisioning communication devices responsive to the generated provisioning script.

18. A method as defined in claim 17, further comprising providing a provisioning engine positioned in communication with the input communications port and the output communications port which retrieves the due orders, retrieves the at least one provisioning rule, and generates the provisioning script.

19. A method as defined in claim 18, wherein the input communications port includes an input scripted provisioning driver, and wherein the output communications port includes an output scripted provisioning driver.

20. A system for provisioning communication devices, the system comprising:
    customer order interfacing means for interfacingly receiving a customer service order, the customer order interfacing means including an input scripted provisioning driver;
    rule-based script selecting means positioned in communications with said customer order interfacing means for selecting a rule-based script responsive to a rule for a transaction type; and communication devices interfacing means positioned in communications with said rule-based script provision generating means for interfacingly providing he rule-based script to communication devices to thereby perform a provisioning request thereon, and wherein the communication devices interfacing means includes an output scripted provisioning driver.

21. A system as defined in claim 20, further comprising rule-based script provision generating means positioned in communication with a user interface for generating a rule-based script to provision communication devices.

22. A system as defined in claim 20, wherein the rule-based script provision selecting means includes a provisioning engine having a customer order database for storing customer orders therein, the customer order including a transaction type, a rule database for storing a plurality of provisioning rules therein, and a rule-based executor responsive to the customer order database and the rule database for executing a provisioning script based upon the transaction type of a customer order.

23. A method of provisioning communication devices comprising the steps of:
    retrieving a customer order from an input communications port;
    transferring the customer order to an order database;
    retrieving a due order from the order database, the due order being representative of a next customer order due;
    retrieving at least one provisioning rule from a rule database having a plurality of rules stored therein and responsive to the retrieve due order;
    executing a provisioning script representative of instructions for provisioning communication devices to provide a customer selected service responsive to the at least one retrieved provisioning rule; and
    provisioning communication devices responsive to the generated provisioning script, the step of provisioning communication devices including transferring the generated provisioning script to an output communications port.

24. A system for provisioning communication devices, the system comprising:
    customer order interfacing means for interfacingly receiving a customer service order;
    rule-based script selecting means positioned in communications with said customer order interfacing means for selecting a rule-based script responsive to a rule for a transaction type, the rule-based script provision selecting means including a provisioning engine having a customer order database for storing customer orders therein, a rule database for storing a plurality of provisioning rules therein, and a rule-based executor responsive to the customer order database and the rule database for executing a provisioning script based upon the transaction type of the customer order, the customer order including a transaction type; and
    communication devices interfacing means positioned in communications with said rule-based script provision generating means for interfacingly providing the rule-based script to communication devices to thereby perform a provisioning request thereon.

* * * * *